United States Patent [19]

Argo et al.

[11] Patent Number: 5,191,594

[45] Date of Patent: Mar. 2, 1993

[54] FADING CHANNEL SIMULATOR

[75] Inventors: Paul E. Argo; T. Joseph Fitzgerald, both of Los Alamos, N. Mex.

[73] Assignee: The United States of America as represented by the United States Department of Energy, Washington, D.C.

[21] Appl. No.: 798,780

[22] Filed: Nov. 27, 1991

[51] Int. Cl.$^5$ .......................... H04L 1/04; H04B 1/10; H04B 15/00
[52] U.S. Cl. ........................................ 375/1; 455/52.3
[58] Field of Search .................. 375/1; 455/52.1, 52.3, 455/65; 364/801, 802

[56] References Cited

U.S. PATENT DOCUMENTS

| | | | |
|---|---|---|---|
| 4,105,958 | 8/1978 | Pierce et al. | 364/802 |
| 4,349,915 | 9/1982 | Costas | 455/65 |
| 4,607,375 | 8/1986 | Lee | 375/1 |
| 4,658,436 | 4/1987 | Hill | 375/1 |
| 4,737,928 | 4/1988 | Parl et al. | 364/801 |
| 4,977,607 | 12/1990 | Maucksch et al. | 455/52.1 |
| 5,062,148 | 10/1991 | Edwards | 455/52.3 |

OTHER PUBLICATIONS

P. A. Bello, "Characterization of Randomly Time-Variant Linear Channels," IEEE Trans. Communications Systems, vol. CS-11, pp. 360-393 (Dec. 1963).
P. A. Bello, "Measurement of Random Time-Variant Linear Channels," IEEE Trans. Information Theory, vol. IT-15, No. 4, pp. 469-475 (Jul. 1969).
C. G. Watterson et al., "Experimental Confirmation of an HF Channel Model," IEEE Trans. Communication Technology, vol. COM-18, No. 6, pp. 792-803 (Dec. 1970).
P. A. Bello, "Some Techniques for the Instantaneous Real-Time Measurement of Multipath and Dopper Spread," IEEE Trans. Communication Technology, vol. 13, No. 3, pp. 285-291 (Sep. 1965).
R. A. Shepard et al., "Frequency Spread in Ionospheric Radio Propagation," IEEE Trans. Communication Technology, vol. COM-15, No. 2, pp. 268-275 (Apr. 1967).

Primary Examiner—Salvatore Cangialosi
Attorney, Agent, or Firm—Ray G. Wilson; Paul D. Gaetjens; William R. Moser

[57] ABSTRACT

Fading channel effects on a transmitted communication signal are simulated with both frequency and time variations using a channel scattering function to affect the transmitted signal. A conventional channel scattering function is converted to a series of channel realizations by multiplying the square root of the channel scattering function by a complex number of which the real and imaginary parts are each independent variables. The two-dimensional inverse-FFT of this complex-valued channel realization yields a matrix of channel coefficients that provide a complete frequency-time description of the channel. The transmitted radio signal is segmented to provide a series of transmitted signal and each segment is subject to FFT to generate a series of signal coefficient matrices. The channel coefficient matrices and signal coefficient matrices are then multiplied and subjected to inverse-FFT to output a signal representing the received affected radio signal. A variety of channel scattering functions can be used to characterize the response of a transmitter-receiver system to such atmospheric effects.

8 Claims, 4 Drawing Sheets

FADING CHANNEL SIMULATOR

BACKGROUND OF INVENTION

This invention relates to high frequency (HF) radio signal propagation through fading channels and, more particularly, to simulation of fading channels in order to characterize HF radio system performance in transmitting and receiving signals through such fading channels. This invention is the result of a contract with the Department of Energy (Contract No. W-7405-ENG-36).

HF radio signals propagate through the ionosphere along a variety of paths of different length ("multipaths") and with different propagation characteristics. Interference arises between the signals on the various paths producing signal fading on time scales from a fraction of a second to a few seconds, whereby the "fading channels" produce a degradation of the signal quality. Methods of modulation, diversity, and coding in the system design are selected in order to minimize this signal degradation.

Testing of HF communication systems can be done by using operational systems either through a real circuit, or through a channel simulator. Real circuit tests can be expensive, and may not provide actual "worst case" situations. Alternately, one must ensure that the channel simulator accurately depicts the effects of a "real" channel.

HF ionospheric channels are nonstationary in both frequency and time, but for narrow bandwidths (tens of kHz) and short times (minutes) most channels can be adequately represented by a stationary model. In addition, except under extreme conditions, the ionosphere supports propagation over a limited number of discrete modes representing different average signal levels and delays. Moreover, each path will show a different fading rate and delay spread.

A radio channel may be modeled as a randomly time-varying linear channel that can be characterized by a channel scattering function. This scattering function is defined as the density of power scattered by the channel as a function of Doppler shift, time delay, and spatial angle-of-arrival. A received HF signal is usually the composite of several signals arriving via different ionospheric propagation modes, and the signal power is spread in the three dimensions of time, frequency, and arrival angle.

Time spreading is the result of the signal propagating via two or more paths having slightly different propagation times. Frequency spreading is the result of movements of the reflecting ionospheric layers and of the time variation of the electron density along the ray paths, both of which cause changes in the phase of the received signal. The rate of change of phase can be interpreted as a Doppler shift of the transmitted frequency.

A line-of-sight propagation channel can be characterized by a linear filter described by a gain $G(f,t)$ and a propagation time delay $t_o$, where $G(f,t)$ is likely to be a complex valued function. The time varying frequency response of such a channel is:

$$H(f,t) = G(f,t)e^{-2\pi f t_o}$$

where f is the frequency and t is the time.

A multipath channel can be described as a linear sum of several such channels, or "modes":

$$H(f,t) = \Sigma_i G_i(f,t)e^{-j2\pi f t_i},$$

where i labels the individual modes.

Signal fading is simply the constructive and destructive interferences generated by the vector addition of the signal propagated through these several channels.

An exemplary channel scattering function is described in Proakis, *Digital Communications*, McGraw-Hill, New York 1989. See also Bello, "Characterization of Randomly Time-Variant Linear Channels," IEEE Trans. Commun. Systems, pp. 360–393 (December 1963). Both teachings are incorporated herein by reference. A channel correlation function, $\phi_c(\Delta f, \Delta t)$, describes the correlation in frequency and time of the channel response, $H(f,t)$, and is given by:

$$\phi_c(\Delta f, \Delta t) = \tfrac{1}{2}[H^*(f,t)H(f+\Delta f, t+\Delta t)]$$

where the square brackets denote the expectation value. The channel correlation function describes the coherence bandwidth and coherence time of the channel. The two-dimensional Fourier transform, $S(\tau,\lambda)$, is called the channel scattering function and describes the channel response in delay, $\tau$, and Doppler frequency, $\lambda$, where $$S(\tau,\lambda) = \int_{-\infty}^{\infty} \int_{-\infty}^{\infty} \phi_c(\Delta f, \Delta t) e^{-j2\pi\lambda\Delta t} e^{-2\pi\tau\Delta f} d\Delta t d\Delta f.$$

A form of scattering function is illustrated by FIG. 1, which graphically depicts power density as a function of delay, $\tau$, and Doppler frequency, $\lambda$.

Given the Fourier transform relation between the channel correlation function, $\phi_c$, and the channel scattering function, S, the Wiener-Khintchine theorem may be applied to interpret the channel scattering function, $S(\tau,\lambda)$, as the average power spectral density of the random process, $H(f,t)$. Then a realization of $H(f,t)$ may be generated with the known technique of inverse Fourier transforming the random complex process, $h(\tau,\lambda)$, whose real and imaginary parts are independent, Gaussian random variables, each with zero mean and variance of $S(\tau,\lambda)/2$.

In the usual characterization of a channel, the gain function (G) is not treated as a function of frequency (f), so that the channel is in reality a "nonselective or multiplicative" fading channel. In this case, all frequencies fade together. In most cases using this characterization, the delay is treated as a fixed delta function in time, with Rayleigh fading imposed upon each modal gain function. Further, in order to generate a statistical model for the short term fading channel, one must assume stationary statistics, i.e., that the mean values of the model parameters are constant. Then the channel model presents a particular realization of a stochastic process.

In one prior art representation, Watterson et al., Experimental Confirmation of an "HF Channel Model," COM-18 IEEE Trans. Commun. Technol., No. 6, pp. 792-803 (1970), showed that the channel can be modeled as a "tapped delay line" with a limited number of taps with adjustable delays. The signal at each tap is modulated in phase and amplitude by a suitable tap-gain function, and the several delayed and modulated signals are summed to form the output signal. The Watterson model uses "independent zero-mean complex-Gaussian functions with Rayleigh amplitude and uniform phase density" to modulate the incoming signal.

It would be desirable to represent the channel transmissions as a function of frequency and to provide nonstationary channel statistics to more accurately model fading channels for HF radio transmission. These problems are addressed by the present invention wherein a channel scattering function is used to represent the channel delay-spread and Doppler-spread functions.

Accordingly, it is an object of the present invention to provide the channel gain function as a function of frequency.

It is another object of the present invention to provide a time varying representation of channel transmissions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF INVENTION

To achieve the foregoing and other objects, and in accordance with the purposes of the present invention, as embodied and broadly described herein, the apparatus of this invention may comprise a fading channel simulator for use in testing fading channel transmission characteristics of a receiver and transmitter in a communications system. A first transform circuit receives an input analog output from the transmitter and outputs a plurality of Fast Fourier Transform (FFT) signal coefficient matrices. Each FFT matrix corresponds to one of a series of segments in a data string representing the transmitter analog output. A second transform circuit receives a selected scattering function and outputs a plurality of inverse-FFT channel realization coefficient matrices to represent successive channel delay-spread and Doppler-spread characteristics. Each one of the stored signal coefficient matrices is then multiplied with one of the channel realization coefficient matrices to form an output matrix. An output converter then performs an inverse FFT on each output matrix to output a faded channel signal string representing the transmitted radio signal for input to the receiver.

In another characterization of the present invention, fading channel effects on a transmitted high frequency radio signal are simulated. A series of complex realizations of the fading channel are generated from a channel scattering function including both a delay-spread function and a Doppler-spread function. A series of segments are formed from the transmitted radio signal. Each segment is then affected by one of the realizations of the fading channel to generate a received signal. The received signal segments are then combined to recreate a received signal with amplitude and phase fading effects for input to a receiver.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
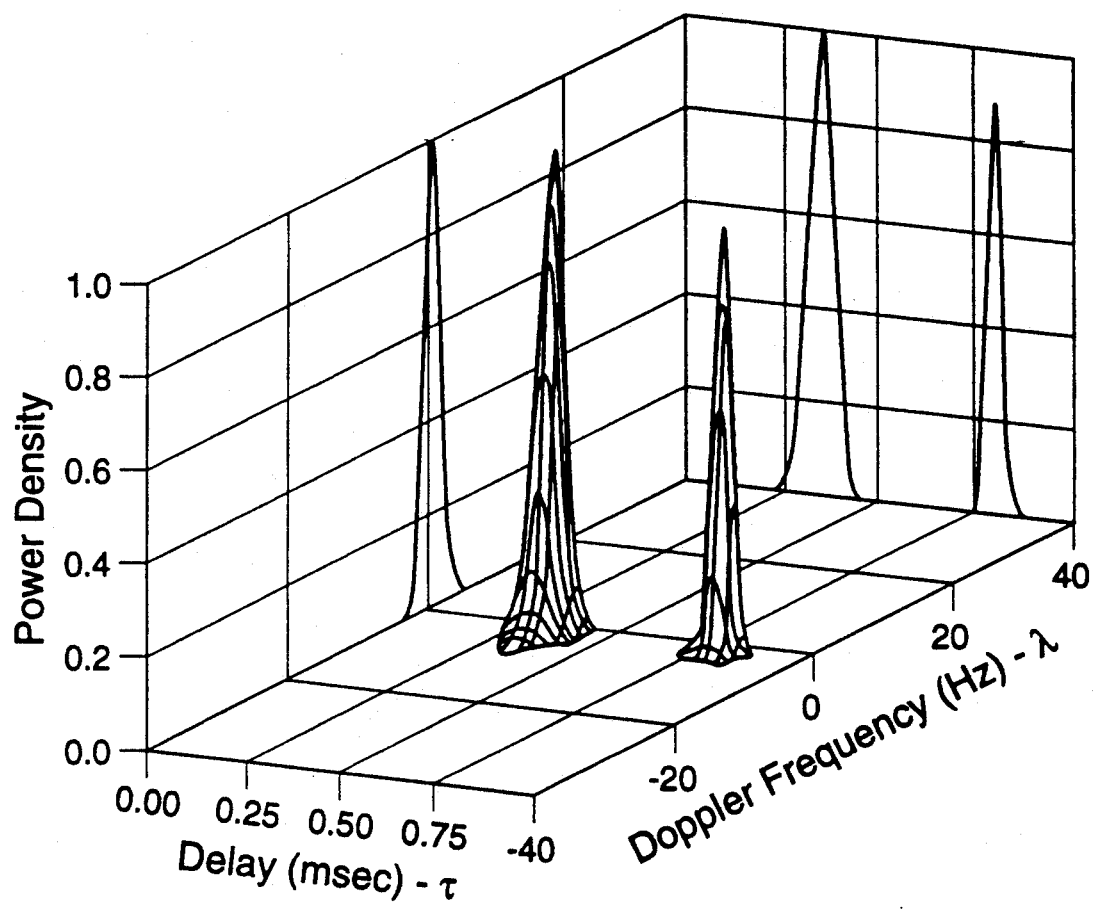
FIG. 1 graphically depicts a form of a channel scattering function.
Figure 2:
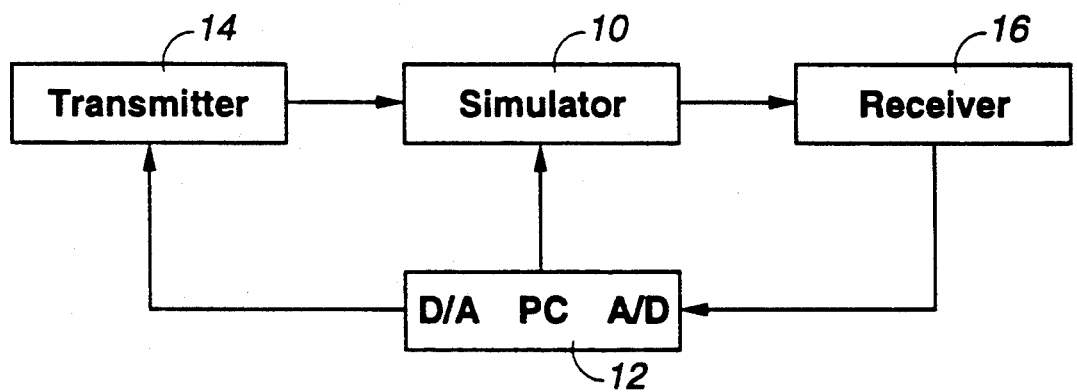
FIG. 2 is a block diagram of a fading channel simulator system according to the present invention.

Referring first to FIG. 2, there is shown a block diagram of a fading channel simulation system according to the present invention. Simulator 10 affects fading channel performance with delay-spread functions and Doppler-spread characteristics controlled by computer 12. A channel scattering function is implemented through computer 12, where the Doppler-spread function is related through a Fourier transform to the signal decorrelation (fading) time and is, in fact, the function modeled in the tap-gain simulators of Watterson. The delay-spread function similarly is related to signal decorrelation in frequency and modeled in the tap-gain simulators as a delta function.

Transmitter 14 outputs a signal controlled by computer 12 in response to the signal received by receiver 16 in order to analyze the system overall transmission characteristics. According to the present invention, simulator 10 acts to obtain both the input radio signal and the channel scattering function, as described below, and then convolves the two inputs to obtain an output transmission that simulates an actual radio frequency transmission through the ionosphere with both amplitude and phase modulation effects of a fading channel. The convolution is implemented by multiplying the inverse FFT of the scattering function and the FFT of the input radio signal.

The tap-gain channel simulation embodies the notion that measurements of channel fading statistics lead to Rayleigh fade characteristics. However, channel probe measurements of the high frequency radio channels have led to the concept of a "channel scattering function," as depicted in Proakis, for example. This channel scattering function is comprised of both a delay-spread function and a Doppler-spread function, which affect signal decorrelation as noted above. The present simulator recognizes that the channel scattering function gives a complete description of the frequency-time effects of the channel so that the fading, both in time and frequency, can be determined from the inverse Fourier transforms of the scattering function.

The present simulator provides a scattering function in a manner that can be meaningfully applied to a signal propagating through the channel. This is done by generating a series of "realizations" of the channel that can be sequentially applied to the signal. The channel realizations are derived by generating a two-dimensional power spectral density function, obtained by taking the square root of the scattering function, e.g. as defined by Proakis or Bello, and multiplying each point by a complex number of which the real and imaginary parts are each independent Gaussian random variables with zero mean and unit variance. The two-dimensional inverse-FFT of this complex-valued channel realization yields a matrix of channel coefficients to provide a complete frequency-time description of the channel that can now be multiplied with the matrix representing the FFT of the signal to realize signal decorrelations in both time and frequency.

It should be recognized that a given fading channel characteristic is constant only over short time periods. Thus, the signal stream is broken into time segments, each having a duration selected to match the length of the delay axis of the scattering function so that the segments of transformed signal match the frequency resolution of the scattering function. Each segment of the input signal is then Fourier decomposed into a set of coefficients representing the signal frequency content as a function of time. The matrix of channel coefficients is multiplied with a corresponding matrix of signal coefficients to provide an output matrix with coefficients functionally related to the received signal with imposed fading channel effects The inverse FFT of the output matrix is obtained to generate an output signal with a sequence of fades consistent with the channel described by the channel scattering function.

Thus, successive signal segments are processed with successive channel realizations. By reassembling the output signal segments in time, a complete received signal is obtained having both frequency and time dependent characteristics, a result that is not available from tapped delay-line models of the fading channels.

Figure 3:
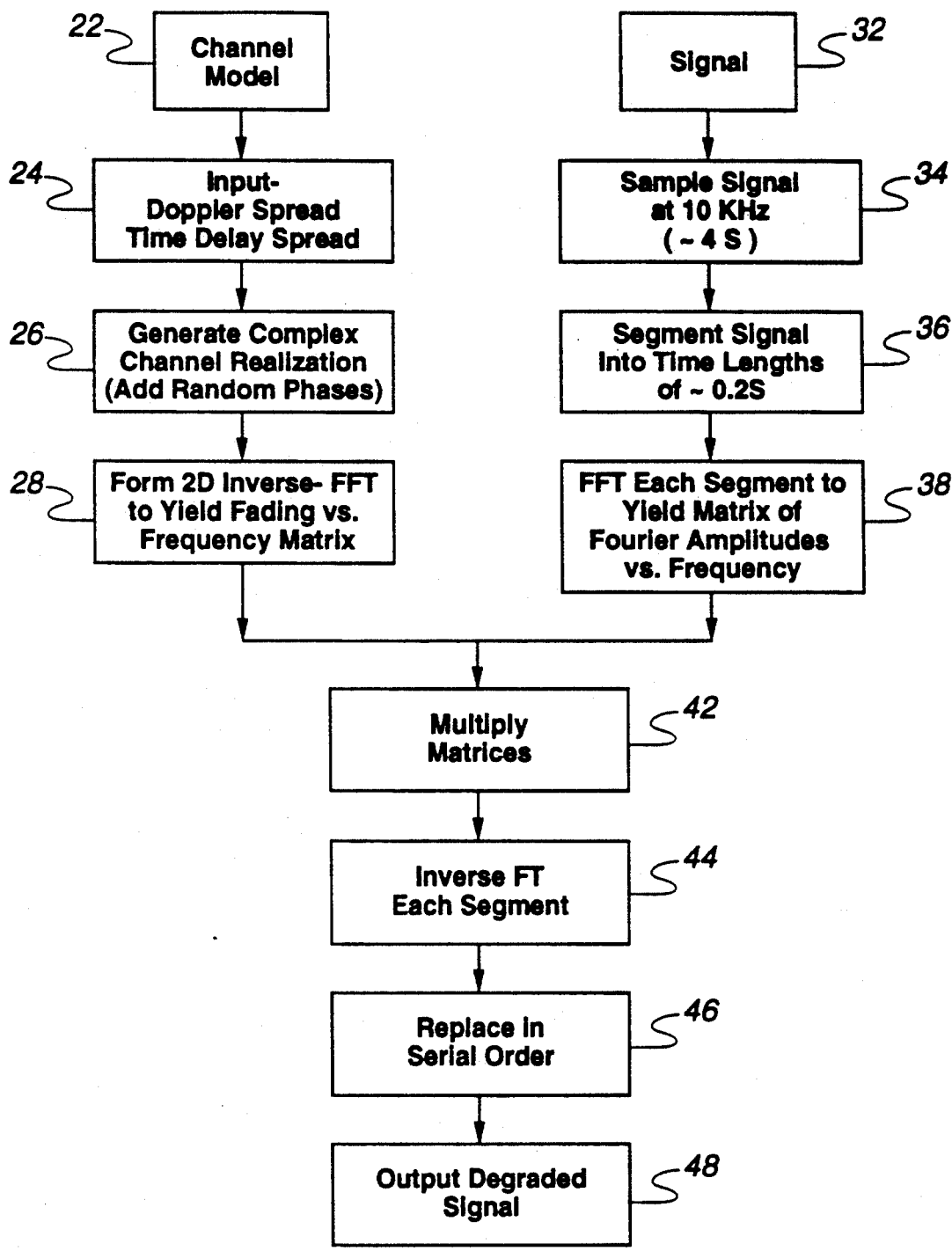
FIG. 3 is a flow diagram for the operation of the system shown in FIG. 1.

Referring now to FIG. 3, there is shown a flow diagram of the process for simulating a fading channel according to the present invention. Computer 12 (FIG. 2) calls the channel model function which inputs 24 a Doppler-spread function and a delay-spread function, similar to the square root of the function illustrated in Figure with delay and Doppler values selected to be representative of specified channel characteristics for which a system is to be designed. A complex-valued channel realization is generated 26 by multiplying the square root of the real channel scattering function by a complex number of which the real and imaginary parts are each independent Gaussian random variables with zero mean and unit variance. The 2D inverse-FFT 28 of the complex channel then provides a matrix of coefficients functionally related to the fading vs. frequency characteristics of the channel.

The signal function call 32 first samples 34 the output high frequency radio signal from transmitter 14 (FIG. 2) at a selected rate for digitizing the signal, e.g., at 10 kHz, for a representative period of time, e.g., about 4 seconds, and segments 36 the signal into time lengths, e.g., of about 0.2 seconds. The FFT of each signal segment is then formed 38 to yield a matrix of signal coefficients for each segment to represent the Fourier amplitude vs. frequency.

The matrix of channel coefficients multiplies 42 the matrix of signal coefficients and the inverse FFT of the resulting matrix is then obtained 44 to represent a segment of received signal. The successive channel realizations and signal segments are similarly processed and the received signal segments are reassembled 46 in time to form the degraded output signal 48 for input to receiver 16 (FIG. 2). The output from receiver 16 may be used by computer 12 to formulate a revised channel model for further testing.

Figure 4:
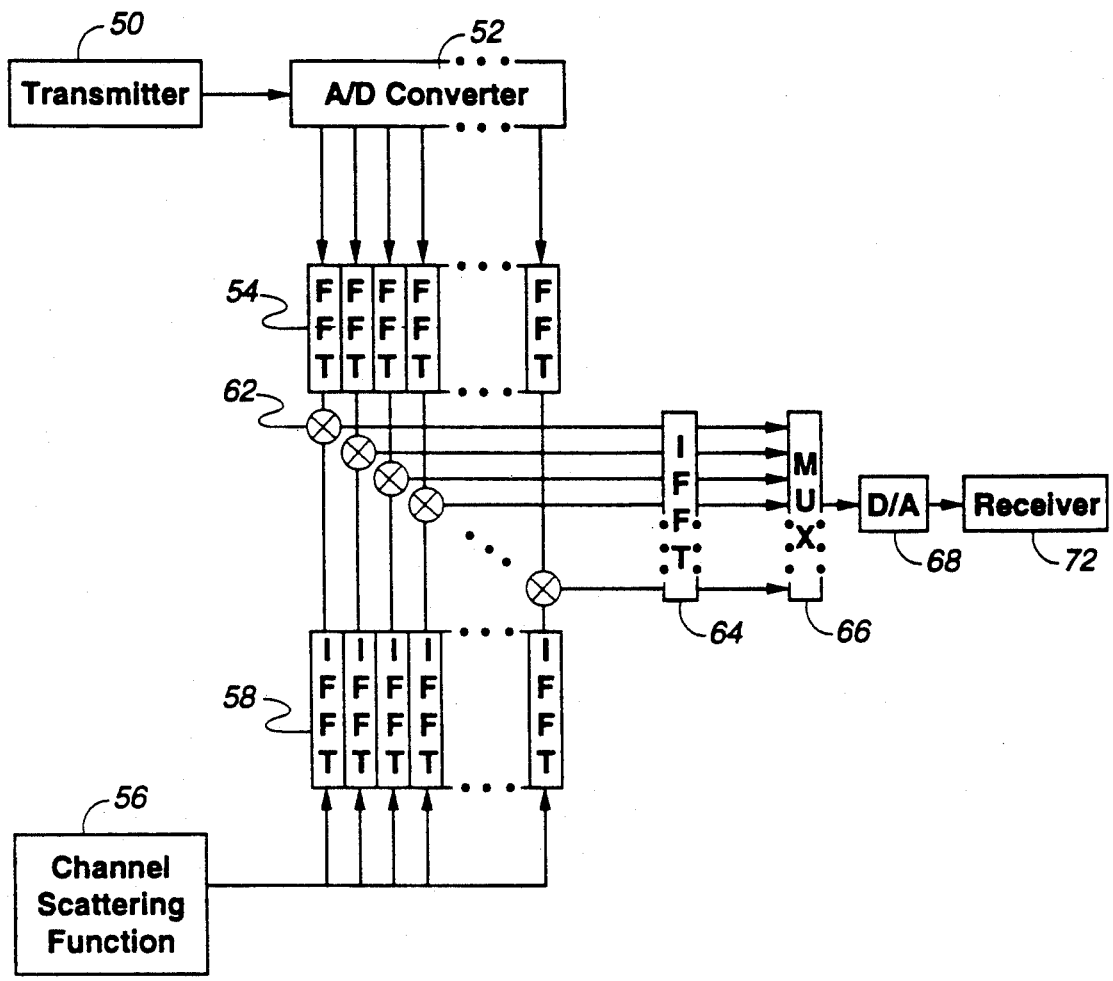
FIG. 4 is a schematic in block diagram form of a system for performing the method shown in FIG. 2.

FIG. 4 depicts a schematic in block diagram form of one embodiment of hardware for implementing the flow diagram shown in FIG. 3. Transmitter 50 outputs a signal for input to A/D converter 52 where the signal is digitized and formed into segments each having a selected length. Each segment is input to FFT converters 54. which generate parallel outputs to multipliers 62. Complex scattering function generator 56 provides an output to inverse-FFT converters 58 which generate parallel outputs to multipliers 62. Multipliers 62 multiply the matrix coefficients formed in converters 54 and 58 to provide parallel outputs to inverse FFT converter 64. Each resulting output from converter 64 represents a segment of the received signal and the outputs are provided to multiplexer 66. Multiplexer 66 sequentially outputs the input segments to assemble the received radio signal. The output signal is processed through digital-to-analog converter 68 for input to receiver 72 as the degraded high frequency received radio signal.

The fading channel simulator herein described is extremely versatile with the capability to simulate fading channels with continuously variable characteristics. Dispersive effects can be applied easily to the simulator by forcing a frequency dependent phase shift across the transformed channel scattering function. Quadratic phase changes might be used to simulate HF ionospheric channels, or inverse-frequency-cubed changes to simulate transionospheric satellite channels. Further, both white noise and frequency dependent noise might be digitally applied to the input signal stream either in the transformed or untransformed domain. Although the above description is directed to HF radio transmissions, the method and apparatus are generally applicable to communication systems affected by fading multipath channels, e.g., cellular phone systems, VHF line-of-sight systems, and the like.

The foregoing description of preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fading channel simulator for affecting a transmitted radio signal with a selected channel scattering function for use in testing fading channel transmission characteristics of a receiver and transmitter in a communications system, comprising:

first transform means for receiving an analog output from said transmitter and outputting a plurality of Fast Fourier Transform (FFT) signal coefficient matrices, each said FFT matrix corresponding to one of a series of segments in a data string representing said analog output;

second transform means for receiving said selected scattering function and outputting a plurality of inverse-FFT channel realization coefficient matrices, each matrix representing successive delay-spread and Doppler-spread characteristics;

multiplication means for multiplying one of said signal coefficient matrices with one of said channel realization coefficient matrices to form an output matrix; and output signal means for forming the inverse FFT of said output matrix and outputting a faded channel signal string representing said received radio signal for input to said receiver.

2. A fading channel simulator according to claim 1, wherein said first transform means includes: an analog-to-digital converter for receiving said input analog output and outputting a series of digital data strings each having a predetermined duration; and first FFT means for forming and storing a FFT for each one of said series of digital data strings.

3. A fading channel simulator according to claim 1, wherein said second transform means includes: means for generating a time series of complex channel realizations; and second FFT means for forming an inverse-FFT for each complex channel realization in said time series.

4. A fading channel simulator according to claim 2, wherein said second transform means includes: means for generating a time series of complex channel realizations; and second FFT means for forming an inverse-FFT for each complex channel realization in said time series.

5. A method for simulating fading channel effects on a transmitted high frequency radio signal, comprising the steps of:

generating a series of complex realizations of said fading channel from a channel scattering function including both a delay-spread function and a Doppler-spread function;

segmenting said transmitted radio signal into time length segments each having a preselected duration;

forming a digital representation of said signal in each segment;

performing a FFT on each digital representation to obtain a matrix of signal coefficients;

affecting each one of said segments with a one of said realizations of said fading channel to generate a received signal; and combining said received signal segments to recreate a received radio signal with amplitude and phase fading effects for input to a receiver.

6. A simulation method according to claim 5, wherein said step of generating said complex realization of said fading channel further includes the step of forming an inverse-FFT of each complex realization of the channel scattering function in said series to generate a series of channel coefficient matrices.

7. A simulation method according to claim 5, where said step of combining said segments with said transmitted signals comprises the steps of:

multiplying one said signal coefficient matrix with one said channel coefficient matrix to form a combined matrix; and forming the inverse FFT of said combined matrix to provide the effected received signal segment.

8. A simulation method according to claim 7, further including the step of placing said affected received signal segments in an order functionally related to said transmitted radio signal.

* * * * *